United States Patent
Tourapis et al.

(10) Patent No.: US 10,349,064 B2
(45) Date of Patent: Jul. 9, 2019

(54) ADAPTIVE CHROMA DOWNSAMPLING AND COLOR SPACE CONVERSION TECHNIQUES

(71) Applicant: Apple Inc., Cupertino, CA (US)

(72) Inventors: Alexandros Michael Tourapis, Milpitas, CA (US); Yeping Su, Sunnyvale, CA (US); David William Singer, San Francisco, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 15/066,992

(22) Filed: Mar. 10, 2016

(65) Prior Publication Data
US 2016/0269733 A1 Sep. 15, 2016

Related U.S. Application Data

(60) Provisional application No. 62/131,052, filed on Mar. 10, 2015.

(51) Int. Cl.
*H04N 19/186* (2014.01)
*H04N 19/189* (2014.01)
(Continued)

(52) U.S. Cl.
CPC ........... *H04N 19/186* (2014.11); *H04N 9/64* (2013.01); *H04N 9/67* (2013.01); *H04N 11/20* (2013.01); *H04N 19/117* (2014.11); *H04N 19/132* (2014.11); *H04N 19/147* (2014.11); *H04N 19/154* (2014.11); *H04N 19/189* (2014.11);
(Continued)

(58) Field of Classification Search
None
See application file for complete search history.

(56) References Cited

U.S. PATENT DOCUMENTS 5,649,030 A * 7/1997 Normile ............... G06T 9/008
348/417.1
5,650,824 A 7/1997 Huang
(Continued)

FOREIGN PATENT DOCUMENTS

EP 1720358 A2 11/2006
EP 2144432 A1 1/2010
(Continued)

OTHER PUBLICATIONS

Lin, et al., "Mixed Chroma Sampling-Rate High Efficiency Video Coding for Full-Chroma Screen Content," IEEE Transactions on Circuits and Systems for Video Technology, vol. 23, No. 1, Jan. 2013.*
(Continued)

*Primary Examiner* — Michael J Hess
(74) *Attorney, Agent, or Firm* — BakerHostetler

(57) ABSTRACT

A method of adaptive chroma downsampling is presented. The method comprises converting a source image to a converted image in an output color format, applying a plurality of downsample filters to the converted image and estimating a distortion for each filter chose the filter that produces the minimum distortion. The distortion estimation includes applying an upsample filter, and a pixel is output based on the chosen filter. Methods for closed loop conversions are also presented.

30 Claims, 8 Drawing Sheets

(51) Int. Cl.
*H04N 9/64* (2006.01)
*H04N 11/20* (2006.01)
*H04N 19/70* (2014.01)
*H04N 19/147* (2014.01)
*H04N 19/46* (2014.01)
*H04N 19/117* (2014.01)
*H04N 19/132* (2014.01)
*H04N 19/154* (2014.01)
*H04N 19/80* (2014.01)
*H04N 19/85* (2014.01)
*H04N 19/59* (2014.01)
*H04N 19/44* (2014.01)
*H04N 9/67* (2006.01)

(52) U.S. Cl.
CPC .............. *H04N 19/44* (2014.11); *H04N 19/46* (2014.11); *H04N 19/59* (2014.11); *H04N 19/70* (2014.11); *H04N 19/80* (2014.11); *H04N 19/85* (2014.11)

(56) References Cited

U.S. PATENT DOCUMENTS

| | | | | |
|---|---|---|---|---|
| 6,044,172 | A | * | 3/2000 | Allen ................... H04N 1/646 358/523 |
| 6,188,730 | B1 | | 2/2001 | Ngai et al. |
| 2004/0008790 | A1 | | 1/2004 | Rodriguez |
| 2010/0046612 | A1 | | 2/2010 | Sun et al. |
| 2011/0002554 | A1 | * | 1/2011 | Uslubas ............... H04N 19/176 382/238 |
| 2012/0033040 | A1 | * | 2/2012 | Pahalawatta ......... H04N 19/597 348/43 |
| 2013/0039430 | A1 | | 2/2013 | Su et al. |
| 2013/0182952 | A1 | | 7/2013 | Carmel et al. |
| 2014/0334724 | A1 | * | 11/2014 | Wu ........................ H04N 19/91 382/166 |
| 2014/0376611 | A1 | | 12/2014 | Kim et al. |
| 2016/0094823 | A1 | * | 3/2016 | Zhai ....................... H04N 1/646 348/453 |
| 2016/0261865 | A1 | * | 9/2016 | Li ............................ H04N 9/64 |
| 2016/0261884 | A1 | * | 9/2016 | Li .......................... H04N 19/13 |
| 2016/0261885 | A1 | * | 9/2016 | Li ......................... H04N 19/176 |

FOREIGN PATENT DOCUMENTS

| | | |
|---|---|---|
| EP | 2717588 A1 | 4/2014 |
| EP | 2804378 A1 | 11/2014 |

OTHER PUBLICATIONS

International Patent Application No. PCT/US2016/021856; Int'l Preliminary Report on Patentability; dated Sep. 21, 2017; 8 pages.
Recommendation ITU-R BT.2020-1, "Parameter values for ultra-high definition television systems for production and international programme exchange", BT Series, Jun. 2014. 8 pages.
Ramasubramonian et al.; "Unsampling and downsampling filters for HDR content"; Joint Collaborative Team on Video Coding; Document JCTVC-U0134rl; Jun. 26, 2015; 4 pages.
Dai et al.; "AHG7: A Consumer 4:4:4 Coding Method Based on A 4:2:0"; Joint Collaborative Team on Video Coding: Document JCTVC-L0175 Jan. 7, 2013; 5 pages.
International Patent Application No. PCT/US2016/021856; Int'l Search Report and the Written Opinion; dated May 19, 2016; 13 pages.

* cited by examiner

ADAPTIVE CHROMA DOWNSAMPLING AND COLOR SPACE CONVERSION TECHNIQUES

CROSS REFERENCE TO RELATED APPLICATIONS

This application claims benefit under 35 U.S.C. § 119(e) of Provisional U.S. patent application No. 62/131,052 filed on Mar. 10, 2015, the contents of which is incorporated herein by reference in its entirety.

BACKGROUND

This application relates to digital image processing techniques.

The present invention relates to video coding techniques. Video distribution systems include a video source and at least one receiving device. The video content may be distributed over a network or over fixed media. To keep complexity and cost low, video content is typically limited in dynamic range, e.g., 8-10 bit signal representations and 4:2:0 color format. Recent advances in display technology, however, have opened the door for the use of more sophisticated content (also referred to as higher quality content), including content characterized as High Dynamic Range (HDR) and/or wide color gamut (WCG), as well as content with increased spatial and/or temporal resolution. This higher quality content is typically converted to a lower range using a Transfer Function (TF) that is followed by a quantization to a particular fixed bit-depth precision (e.g. 8 or 10 bits). The conversion may also include a color space conversion process, in a space that may be friendlier for encoding, as well as color format conversion, e.g. converting data from 4:4:4 or 4:2:2 to a representation with fewer chroma samples (e.g. 4:2:2 and 4:2:0), before encoding for distribution using a video compression system. These steps can introduce banding and other artifacts that may impact and substantially degrade the quality of the video content when decoded and displayed.

BRIEF DESCRIPTION OF THE DRAWINGS

Embodiments of the present disclosure will be described more fully hereinafter with reference to the accompanying drawings, in which.

DETAILED DESCRIPTION

A method, system and computer readable medium are described for converting digital images with adaptive chroma downsampling. The method comprises: converting image content from a source color format to a second color format; for a plurality of candidate downsample filters, filtering converted image content according to the respective downsample filter, filtering the downsample-filtered content according to an upsample filter, and estimating a distortion corresponding to the respective filter from the upsample-filtered content; and generating output image content according to a downsample filter selected according to the estimated distortions.

An additional method system and computer readable medium are described for converting from a source color format to a second color format including: converting the image content from R, G, and B signals of the RGB format into a luma signal; quantizing the luma signal; reconstructing the luma signal by inverse quantization of the quantized luma signal; converting the reconstructed luma signal and the R signal into a Cr signal; and converting the reconstructed luma signal and the B signal into a Cb signal.

Video and image compression systems often operate in a color space/representation different than the capture color space/representation and/or display color space/representation. For example, video may be captured in an RGB color space but will be translated to a YCbCr color space. This is done to maximize the compression properties of the video signal, by essentially exploiting redundancies and moving into color spaces that may have better compression, homogeneity, and error masking properties.

Commonly, decoders and receivers conventionally have a limited or known number of filters, including those implemented for upsampling the decoded data to fit a particular display. However, transmitters, which may include a color format converter, pre-processor, and encoder, conventionally optimize filter selection, including downsampling filters, without consideration for the target device or devices. Accordingly, improved techniques for transmitter and receiver filter selection and color space conversion are provided herein, to be carried out in the image/video processing chain.

Therefore, the inventors perceived a need in the art for improved encoding processes, and in some instances matching improved decoding processes. These improved processes may be capable of handling higher quality content and taking into consideration the captured content and the anticipated decoding operations that results in an improved experience (such as less visual distortion) at the output of a decoder, as compared to using conventional encoders.

Figure 1:
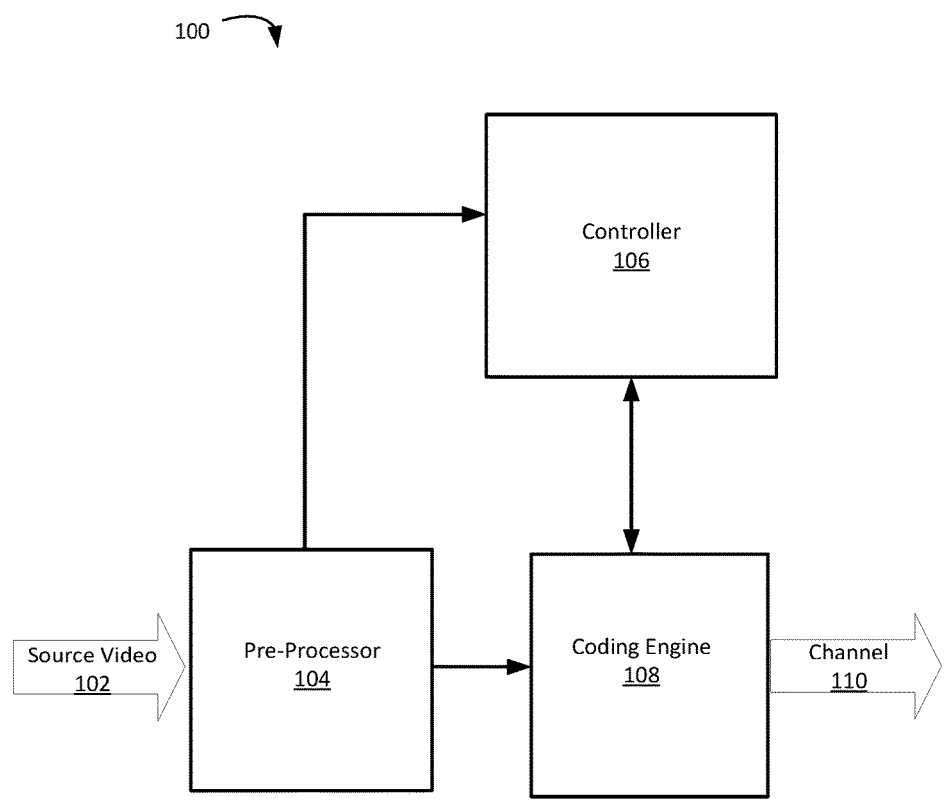
FIG. 1 is a block diagram of an example of a video communication system.

FIG. 1 is a block diagram of an example of a video communication system. Source video 102 is transmitted by a receiver 120 through a communications channel 110 to a receiver 122 to be output as recovered video 118. Transmitter 120 may comprise a pre-processor 104 that outputs pre-processed video data to coding engine 108. A controller 106 may manage pre-processing and encoding operations where applicable. After transmission through communications channel 110, receiver 122 may recover and decode the received encoded video at decoder 112. The post-processing may be applied to the decoded video at post-processor 116. A controller 114 may manage decoding and post-processing where applicable. In embodiments where the post-processing is not fixed, pre-process parameters selected by the pre-processor 104 can be included as side information in the encoded bitstream transmitted over channel 110. Then at the receiver, the side information can be extracted from the encoded bitstream, and used to control the post-processor 116.

Encoding Basics

In video coding systems, a conventional encoder may code a source video sequence into a coded representation that has a smaller bit rate than does the source video and, thereby achieve data compression. A conventional decoder may then invert the coding processes performed by the encoder to retrieve the source video. Coding engine 108 may be a conventional encoder, and decoder 112 may be a conventional decoder.

A video system may include terminals that communicate via a network. Each of the terminals may receive source video data locally and code the video data for transmission as encoded video to another terminal via a channel in the network. In duplex (two-way) communications systems, a terminal at each end will encode video sourced at that end. Each terminal may then receive the coded video data of the other terminal from the network, decode the coded data and display or store the recovered video data. Video terminals may include personal computers (both desktop and laptop computers), tablet computers, handheld computing devices, computer servers, television devices, media players, and/or dedicated video conferencing equipment.

The encoder system may output the coded video data to the channel, which may be a storage device, such as an optical, magnetic or electrical storage device, or a communication channel formed, for example, by a computer network or a communication network such as a wired or wireless network.

A decoder system that may retrieve the coded video data from the channel, invert the coding operations performed by the encoder system, and output decoded video data to an associated display device.

FIG. 1 is a block diagram of an example of a video communication system. With reference again to FIG. 1, a simplex (one-way) terminal may be the transmitter 120. The transmitter 120 may receive image data from a video source 102 that provides video data as a sequence of video images. The video source may be a camera that may include an image sensor to capture an optical image. Pre-processor 104 functions applied to source video may include converting the format conversion as well as image quality enhancements. For example, the captured image data may be captured in the RGB color domain. The captured image data may also be in the linear domain or be in a sensor/camera specific transfer function that may have to be converted to another domain (e.g. back to linear). The captured data, given the characteristics of the imaging sensor, might also require a de-mosaicing algorithm to be applied in order to convert them to a full resolution color image. Video may also have been processed by other steps that follow the capture process, and may include an automatic or manual (guided) color grading process, as well as other steps such as cropping, rescaling, and frame rate and bitdepth converted. The video source may alternatively be a storage device that stores video data authored from other sources (for example, computer graphics or the like). The video data will conventionally be converted to Y'CbCr prior to compression operations using a video codec, though other color spaces may be used by coding engine 108.

A pre-processor 104 receives a sequence of source video data and performs pre-processing operations that condition the source video for subsequent coding. Video pre-processing may be performed upon source video data to render video coding more efficient by performing video processing operations on video pictures such as spatial and or temporal de-noising filtering, bilateral filtering, rescaling or other kinds of processing operations that may improve the efficiency of the coding operations performed by the encoder.

Figure 2:
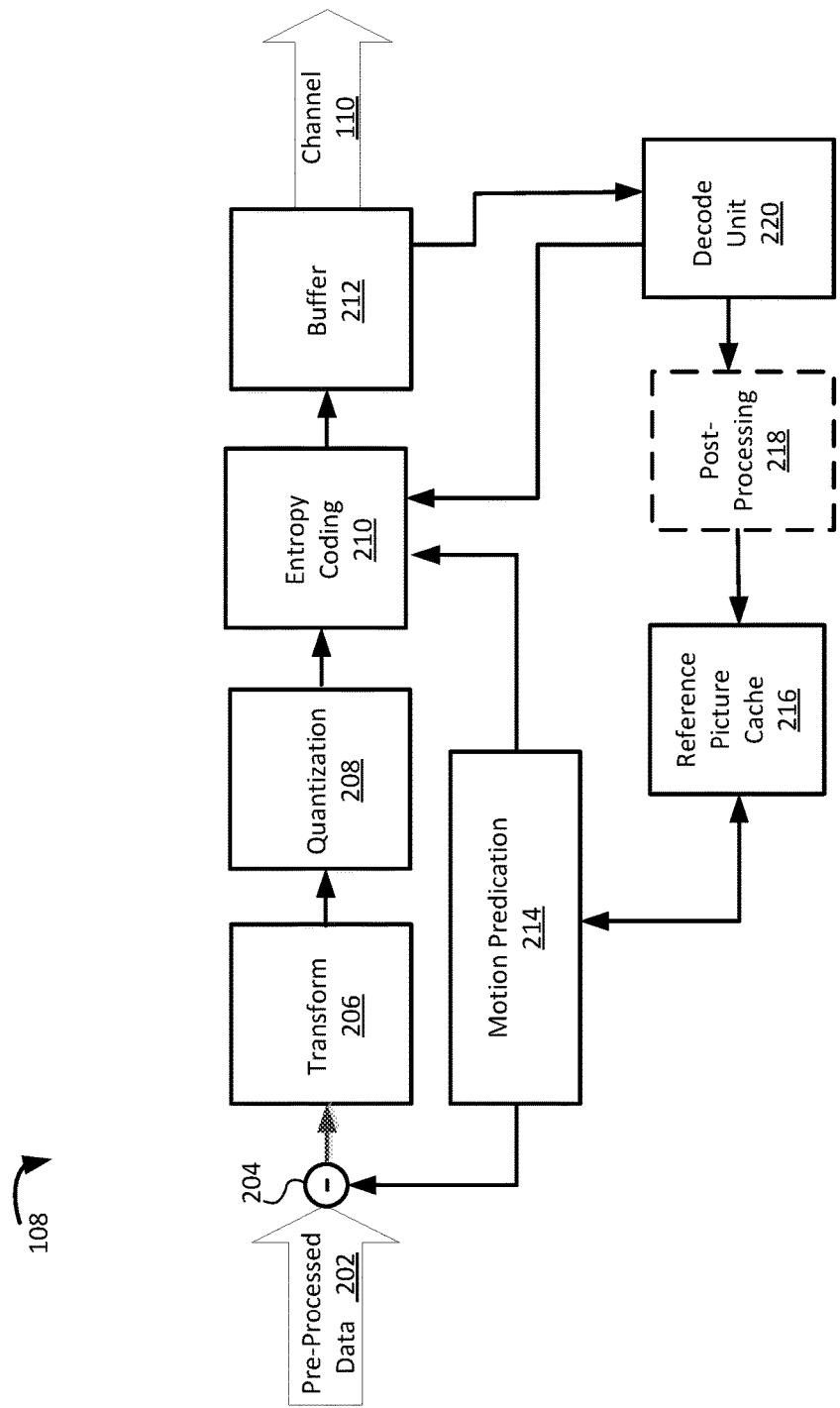
FIG. 2 is a block diagram of an example video coding engine.

A coding engine 108 performs encoding operations on the converted input signal. The encoder may exploit temporal and spatial redundancies in the video data. The encoder may perform motion compensated predictive coding. The coding engine may operate according to a predetermined protocol, such as H.263, H.264/AVC, H.265/HEVC, VP8, VP9, or MPEG-2 among others. The coded video data output from the coding engine may therefore conform to a syntax specified by the protocol being used. FIG. 2 is a block diagram of an example video compression system, and is one example of coding engine 108. The coding engine 108 may include an encoding pipeline further including a transform 206 unit, a quantizer 208 unit, an entropy coder 210, a motion prediction 214 unit may include both intra-frame prediction and motion compensated prediction, and a subtractor 204. The transform 206 unit may convert the processed data into an array of transform coefficients, for example, by a discrete cosine transform (DCT) process or wavelet process. The transform coefficients can then be sent to the quantizer 208 unit where they may be divided by a quantization parameter. Information from the motion prediction 214 unit as well as the quantized data may then be sent to the entropy coder 210 where they may be coded by run-value, run-length, or other entropy coding for compression.

A decode unit 220 decodes the coded video data from the encoder by performing the inverse operations as performed at the coding engine. It may also include an in-loop post-processing 216 unit that may include processes that try to compensate artifacts that may have been introduced by the characteristics of the predictive, transform coding, and quantization processes. In-loop post-processing could include techniques such as in-loop deblocking, sample adaptive offset (SAO) processing, the adaptive loop filtering (ALF) process, or other techniques such as de-banding, sharpening, dithering, and de-ringing among others. After in-loop post-processing, pictures are commonly sent to a reference picture cache 216 and/or a display. A reference picture cache 216 stores previously decoded pictures and other pictures that may be used by the motion prediction unit 216 as reference pictures for future encoding operations.

A channel coder (not depicted) may format coded video data for transmission in a channel, and may add error detection or correction to identify or compensate for errors induced during transmission through the channel. The channel itself may operate according to predetermined communication protocols. The transmitter may format the coded video data according to the protocols that are appropriate for the channel and may output the coded video data to the channel.

Color Space Conversion Optimization

Conventionally, video captured in the RGB space will be converted to the Y'CbCr space, or sometimes called YCbCr, YUV, or Y'UV, via a transform function. This may be accomplished commonly with a 3×3 matrix represented as M[x,y]. This M[x, y] matrix relates to the color primaries and color volume that a particular R, G, and B color space is desired to encompass. Alternatively, just an 1×3 matrix, that corresponds to one of the rows of M[x, y], e.g. the first row, may be used to convert a first component (commonly the Y), followed by a subsequent step to generate all other components given the previous conversions. For example, in the non-constant luminance representation of Y'CbCr as is specified in standard specifications such as ITU-R BT.709 and ITU-R BT.2020 among others, Y' may be calculated as M[1,1]*R'+M[1,2]*G'+M[1,3]*B' where R', G', and B' are the non-constant luminance transformations of the captured RGB image data and M[1,1], M[1,2], M[1,3] appropriate transform coefficients that may relate the conversion of R, G, and B data back to a luminance (Y) signal in the XYZ color space (also known as the International Commission on Illumination or CIE 1976 color space). It should be noted that the R, G, and B data in the non-constant luminance method may have already been converted using an appropriate transfer function method, e.g. power law gamma, ST.2084/PQ or some other transfer function, into non-linear data before this conversion.

Then the Cb and Cr components of the image data may be calculated using either the Y' signal and some of the other transformed components, commonly B' for Cb and R' for Cr, or using only the R', G', and B' values and appropriately defined matrix M coefficient values. In the constant luminance domain, Y' is computed as Y'=(M[1,1]*R+M[1,2]*G+M[1,3]*B)'. The single quote here is an operator indicating application of the transfer function. In this scenario, the transfer function is only applied at the end of the transformation process from R, G, and B to Y, where now these color components are in the linear domain. In some embodiments we may call Y' of the non-constant luminance case as Y_ncl', and of the constant luminace as Y_cl' to differentiate between the two. In others, we may still use Y' for both and differentiate between the two if needed. Commonly, for the constant luminance conversion, only a 1×3 matrix is used to create the Y' component. The Cb and Cr components are then computed based on this value and the B and R quantities after the same transfer function is applied onto them, resulting in B' and R' values.

According to an embodiment, in the non-constant luminance domain, Cb may be calculated as Cb=(B'-Y')*Sb and Cr is calculated as Cr=(R'-Y')*Sr. Sb and Sr relate to the color primaries that a particular R, G, and B color space is desired to contain. In the constant luminance domain, commonly if B'-Y' is less than or equal to zero, Cb is calculated as Cb=(B'-Y')*Nb, otherwise Cb is calculated as Cb=(B'-Y')*Sb. Similarly, if R'-Y' is less than or equal to zero, Cr is calculated as Cr=(R'-Y')*Nr, otherwise Cr is calculated as Cr=(R'-Y')*Sr. In these equations, it is possible to set Nb=Sb and Nr=Sr, but these values are commonly selected given the characteristics of the color space and the transfer function involved in the conversion. In particular, for both cases, i.e. constant and non-constant luminance, it is intended that the Cb and Cr values are always within [−0.5, 0.5]. Given that, one can easily compute the minimum and maximum value that may result for Cb and Cr respectively and determine those quantities. For example, for the non-constant luminance case we would have the following computation for Cb:

$$B'-Y'=-M[1,1]*R'-M[1,2]*G'+(1-M[1,3])*B'$$

The maximum value for this derivation is (1−M[1,3]), and the minimum value is −(M[1,1]+M[1,2]). Therefore the range, before normalization is [−(1−M[1,3]):(1−M[1,3])]. Given this, we can compute that Sb=1/(1−M[1,3])/2. A similar derivation can be applied for the Cr component and Sr.

Similarly, for constant luminance we will have:

$$B'-Y'=B'-(M[1,1]*R+M[1,2]*G+M[1,3]*B)'$$

In this case, the maximum value would be 1−(M[1,3])' and the minimum value would be −(1−M[1,3])'. The range is asymmetric, and transfer function dependent. Given these values one can derive the Nb and Sb quantities, and similarly can also compute the Nr and Sr quantities for Cr.

In an embodiment, and for the constant luminance case, the Cb/Cr components may be alternatively calculated according to the following:

$$Cb\_temp=(B-Y)*Sb$$

$$Cr\_temp=(R-Y)*Sr$$

where Y here is in the linear space, and also corresponds to the actual luminance information of the signal. Sb and Sr are quantities that try to preserve the color information as much as possible, given a subsequent quantization process. Then:

$$Cb=\text{sign}(Cb\_temp)*TFcb(\text{abs}(Cb\_temp))$$

$$Cr=\text{sign}(Cr\_temp)*TFcr(\text{abs}(Cr\_temp))$$

Where the TFcb/ITFcb and TFcr/ITFcr correspond to a particular transfer function and its inverse applied to each color component. Note that this transfer function does not need to be the same as the transfer function applied for generating the Y' component. The TF could be more subjectively "tuned" for color information, or the same TF that is applied on Y may be applied.

Similar considerations for deriving Sb and Sr need to be applied as discussed previously, i.e. we need to ensure that the Cb and Cr quantities remain within the [−0.5, 0.5] range after conversion.

In an embodiment, and for the non-constant luminance case, the Cb/Cr components may be calculated according to the following:

First calculate the Y component as Y'=M[1,1]*R'+M[1,2]*G'+M[1,3]*B'. Y' is then converted to an inverted transform form Y_ncl, Y_ncl=ITF(Y'). It should be noted that commonly, i.e. unless the TF was a linear TF, Y_ncl!=Y. Then:

$$Cb\_temp=(B-ITF(Y'))*Sb$$

$$Cr\_temp=(R-ITF(Y'))*Sr$$

And as above, $$Cb=\text{sign}(Cb\_temp)*TFcb(\text{abs}(Cb\_temp))$$

$$Cr=\text{sign}(Cr\_temp)*TFcr(\text{abs}(Cr\_temp))$$

With TFcb and TFcr being appropriate transfer functions.

Similar considerations for deriving Sb and Sr need to be applied as previously discussed, i.e. the Cb and Cr quantities should remain within the [−0.5, 0.5] range.

According to an embodiment, Sb and Sr may be calculated as:

$$S_b = \frac{\frac{1}{1-M[1,3]}}{2}$$

and $$S_r = \frac{\frac{1}{1-M[1,1]}}{2}.$$

Figure 3:
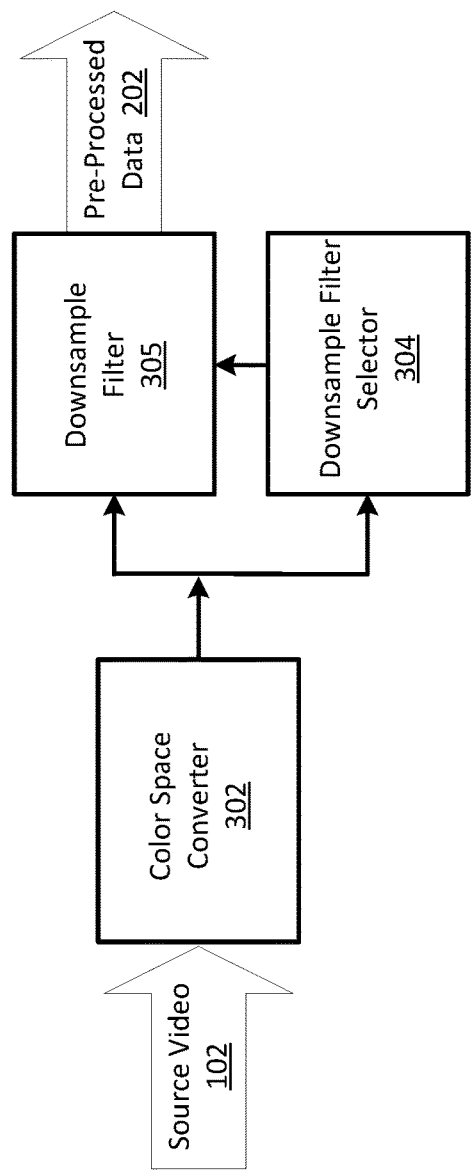
FIG. 3 is a block diagram of an example color format conversion for encoding.

FIG. 3 is a block diagram of an example color format conversion for encoding. Once the color space conversion is completed, quantization and subsampling operations are conventionally performed on the image data in the Y'CbCr color space prior to delivering the data onto an encoder or pre-processing system. In FIG. 3 color space conversion can be performed as described above in converter 302, followed by quantizer 204 and downsampler 306. According to an embodiment, the quantized value of Y' (Yq) may be calculated as Qy(Y') where Qy represents the quantization function. If a downsampling process is used, e.g. from 4:4:4 to 4:2:2 or 4:2:0, or from 4:2:2 to 4:2:0, the down sampled version of Cb and Cr need to be generated using a particular downsampling process. This process can be represented as Down(QCb(Cb)) and Down(QCr(Cr)) respectively where Down( ) is the down sampling function. These steps are commonly inverted prior to display or some other processing that may be desirable. After these processes are completed, and if these data are then passed into an encoder then encoding processes are performed directly on such data. For example, the output of downsampler 306 may be input to pre-processor 104 or directly into coding engine 108 where, for example, prediction, DCT or waveform transform, quantization, and other coding processes may be performed.

Similar functions can be performed inversely as part of decoding operations to generate reconstructed Br', Rr', and Gr'. For example, Yr' may be calculated as IQY(YqN) where IQ( ) is the inverse quantization function. IqN is essentially Iq+N, where N is a noise that is added during encoding or transmission of the data (e.g. quantization noise). The Cbr and Crr may be calculated as IQCb(UP(CbqN)) and IQCr (UP(CrqN)) respectively where UP( ) is an up-sampling function and CbqN and CrqN are the reconstructed chroma data with, similarly some coding noise also introduced into them due to the coding process.

Then, for the conventional method, Br' may be calculated as Cbr/Sb+Yr' and Rr' may be calculated as Crr/Sr+Yr'. Then, solving the above equation for the calculation of Y' for the value of G', Gr' may be calculated as (Yr'−M[1,1]*Rr'−M[1,3]*Br')/M[1,2].

In the methods presented above, the presented conversion and encoding operations are inverted at the decoder. For example, in the constant luminance case, the inversion process for generating B, R, and G components is now performed as follows:

$$Cbr\_temp = \text{sign}(Cbr) * ITFcb(\text{abs}(Cbr))$$

$$Crr\_temp = \text{sign}(Crr) * ITFcr(\text{abs}(Crr))$$

$$Br = Cbr\_temp/Sb + Y$$

$$Rr = Crr\_temp/Sr + Y$$

$$Gr = (Yr - M[1,1]*Rr - M[1,3]*Br)/M[1,2]$$

Similarly, for the non-constant luminance method:

$$Cbr\_temp = \text{sign}(Cbr) * ITFcb(\text{abs}(Cbr))$$

$$Crr\_temp = \text{sign}(Crr) * ITFcr(\text{abs}(Crr))$$

$$Br = Cbr\_temp/Sb + ITF(Y)$$

$$Rr = Crr\_temp/Sr + ITF(Y)$$

$$Gr = (Yr - M[1,1]*Rr - M[1,3]*Br)/M[1,2]$$

Similar considerations for deriving Sb and Sr need to be applied as previously discussed, i.e., we need to ensure that the Cb and Cr quantities remain within the [−0.5, 0.5] range.

Adaptive Chroma Downsampling

As mentioned above, an important step for preparing content for compression is the conversion of the original video data that may be in a 4:4:4 or 4:2:2 arrangement, into a reduced chroma resolution space using a chroma downsampling method. Given the characteristics of the chroma signal, such a step could improve compression while also reducing complexity since fewer samples need to be processed during encoding. An adaptive chroma downsampling method, e.g. from 4:4:4 to 4:2:2 or 4:2:0 is described that involves the consideration of N possible downsampling filters, and adaptively selects the "best" filter for each sample position, resulting in improved performance.

A 4:2:2 format is a luminance-chrominance format where the chrominance channels are downsampled in one dimension, containing a single luminance value for every pixel, but each of the two chrominance channels contain only one value for every other pixel along one dimension of the image. This results in each of the two chrominance channels in a 4:2:2 format containing only one value for every two luma samples along one (typically the horizontal) dimension of the image. A 4:2:0 format is a luminance-chrominance format where the chrominance channels are downsampled in both dimensions, each of the chrominance channels containing only one value for every two luma samples along both dimensions of the image. This results in each chrominance channel in a 4:2:2 format containing a quarter as many values as the luminance channel. A 4:4:4 format is not downsampled and includes three color component values for every pixel.

FIG. 3 is a block diagram of an example color format conversion for encoding. The color format converter of FIG. 3 may be incorporated as part of the pre-processor 104 of FIG. 1, and may output data in a format appropriate to the coding engine 108. In this example, source video 102 is converted in color space, for example from RGB to any of the 4:4:4 luminance-chrominance formats described herein. Downsample filter selector 304 chooses a chroma downsample filter from a set of downsample filter options as described below regarding FIG. 4. The chosen downsample filter 305 is used to generate pre-processed data 202 from the chosen downsample filter 305.

Figure 4:
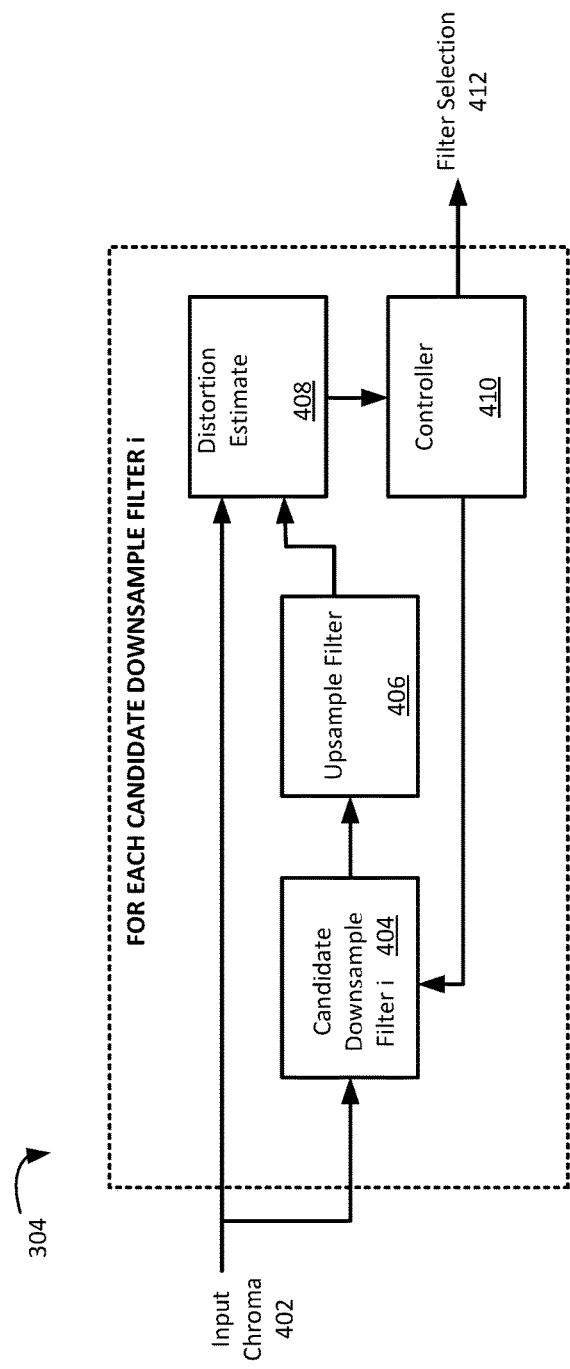
FIG. 4 is a flowchart for an example process for choosing a downsample filter.

FIG. 4 is a flowchart for an example process for choosing a downsample filter. According to an embodiment, the decision of which filter to use for each sample position is based on examining the performance of each filter given a known upsampling filter that would likely be used after decoding (e.g. prior to display, delivery through an interface system etc.). Each filter is evaluated and the one resulting in the least distortion, e.g. sum of square errors (SSE), sum of absolute differences (SAD), Structural Similarity Index Metric (SSIM), or some other measurement of objective distortion, compared to the original signal can be selected as the best filter. As illustrated in FIG. 4, one of the two chroma channels of an image is input at 402. Controller 410 chooses one of N possible downsampling filters to apply at 404 to the input chroma channel. The result of filtering at 404 is then immediately upsampled with the known or assumed upsampling filter at 406, with the result of the upsampling compared at 408 with the original input chroma channel to produce a distortion estimate at 408. The distortion estimate is sent to the controller for the selected filter. This process is repeated for each of the N possible downsample filters to identify the lowest distortion. The filter corresponding to the lowest distortion is then output as the filter selection 412.

According to an embodiment, the encoder may target multiple different delivery systems, e.g. different displays. These displays may have different filters. The known filters from these displays could again be considered and evaluated to select the downsampler that results in the best average performance across all the available upsamplers. The various known display upsamplers could be considered with equal weighting, or could be weighted based on the prevalence and importance of each anticipated upsampler.

An optimal filter may be selected for a frame/picture. Available filters may be evaluated over an entire picture and an optimal filter selected as the filter that results in the best performance over this entire picture. Additionally, smaller units than a picture could be considered. In particular, a picture could be separated in segments, e.g. one or more lines/rows or columns, blocks or tiles etc. For each of these segments we could generate all possible downsampling versions, upconvert given the available upsamplers, and independently select the filters for each segment. The final downsampled image would be the combination of all individual optimized regions. In a particular embodiment we may consider overlapped regions for optimization. For the overlapping areas a weighted average of the samples could be used for the final reconstruction. Weighting could be based on a distance from the boundaries of each region or some other criterion that may include an analysis of the image and the characteristics of the filters. For example, if a sample corresponds to an edge and in one region a sharper filter was selected, while also more edge samples are also within that region, then that filter may be given higher weighting than a filter in another region with fewer edge samples. Similar considerations may apply if the sample is considered as corresponding to texture or a flat region.

Figure 5:
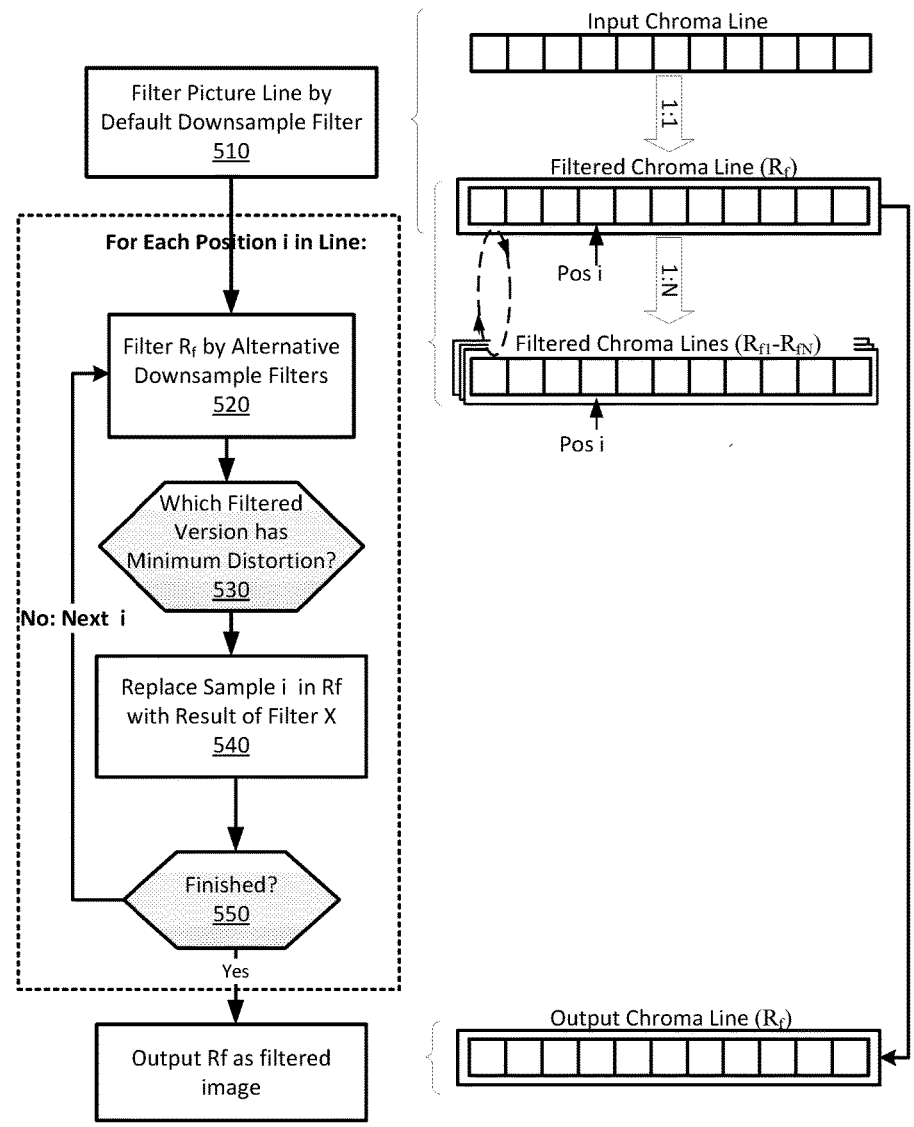
FIG. 5 is a flowchart for an example process for a pixel-by-pixel selection of downsample filters.

FIG. 5 is flowchart for an example process for a pixel-by-pixel selection of downsample filters. According to an embodiment, optimization could be performed for each individual sample. This may provide a better performance than a scheme based on fixed regions. As shown in FIG. 5:

a) For a particular region, e.g. an entire or partial picture line, select one downsampling filter as default. At step 510, apply the default filter on all samples to generate an initial filtered region $R_f$.

b) For each sample in the region, consider all alternate downsampling filters.
  i) For example in step 520, for the current position, filter this position sample given all alternate downsampling filters (e.g. N filters), generating N possible alternative values.
  ii) Then, given the known upsampling filters that are to be considered, downsample and upsample all positions in image $R_f$ impacted by these up samplers (this essentially depends on the number of taps of the up sampling filters) and this particular sample position. Perform the same for all alternatives while considering all other samples having the same filtered value as the region $R_f$.
  iii) Compute the distortion for the impacted region for each applied filter and find the minimum distortion at step 530. The version that has the minimum distortion is declared the current optimal filter for this sample. In step 540, The sample in image $R_f$ is updated given the corresponding filtered sample in this filtered version.
  iv) In step 550, Unless we have reached the end of the region, increment the position and repeat the filtering operations.
  v) If we have reached the end of the region, then we can either terminate (based on a distortion threshold or number of iterations), or repeat the entire process for the sample to further optimize the filter selection. This will provide refinement of the selected downsampler given knowledge from all sides of an image.

According to an embodiment we may consider not just a single initial filtered region, but multiple given different filters. Then for each of these alternate regions we may decide to perform the above optimization given only a subset of the filters. The same regions or differently partitioned regions with some overlapping could be considered as the alternate regions for this process. After the process completes for all of these alternatives, we can then merge the results together. This can be done by merging the outcome from each co-sited sample from the alternative (or intermediate) optimized regions in a variety of ways. In one embodiment, the intermediate outcomes could be averaged together. In an alternative embodiment, these alternatives are now considered as the alternative filter candidates that could be considered for a subsequent optimization step. In this case, the above process is now repeated using these alternatives in the decision process. In this scenario, a new region partitioning may be considered that may be the same as one or more of the initial partitions used or be completely different than the initial partitions considered. Essentially this is now a hierarchical optimization process which can allow for some form of parallelization, whereas, given the reduced number of filters that now need to be considered in each alternative subset region, the complexity would end up being lower.

According to an embodiment, the decision for the filters is augmented by signal pre-analysis, such as edge and texture/variance detection. In particular, we can first analyze an image for edges or texture and classify every sample accordingly. Every sample that is classified as an edge or being near an edge could consider only certain filters for downsampling, whereas flat regions or textured regions could consider other filters. Brightness or color characteristics of a sample or pixel could also be considered. Then, the above optimization steps would only consider the appropriate filters given the mode of the sample.

Consideration of other color components and their characteristics compared to the current component sample can also be made. If a particular filter, for example, was selected for the Cb component, then that filter may likely be the optimal filter for the Cr component filter decision as well. We could skip filters that performed poorly for one component's sample when evaluating the other component's sample for the same position. In addition, if the characteristics (e.g. edge or texture classification) of the different color component samples match, then it is more than likely that the same filter would be used for both components. This can considerably reduce complexity and speed up the downsampling process.

The above process could be performed directly on transfer function domain data (e.g. power law gamma or using a perceptual quantizer-based gamma, e.g. ST.2084/PQ), or directly on linear data.

The process could involve a 4:4:4 to 4:2:2 downsampling, 4:2:2 to 4:2:0, or 4:4:4 to 4:2:0. For the later case, we can first perform adaptive downsampling across one direction, e.g. horizontally, followed by adaptive downsampling across the other direction, e.g. vertically. It is also possible that the process may involve 2D downsampling directly and the conversion could be done in a single step for both dimensions.

Filter Optimization

An encoder may know the filter and transform functions that will be used to upsample the reconstructed image data. Then, with a known upsampling filter, the downsampling filter may be designed to optimize the distortion that will be induced by the upsampling. As previously noted, in an embodiment the encoder may target multiple different delivery systems, e.g. different displays that may have different filters. The known filters for these displays could be considered and evaluated to select the downsampler that results in the best average performance across all the available upsamplers. The various known display upsamplers could be considered with equal weighting, or could be weighted based on the prevalence and importance of each anticipated upsampler.

Figure 6:
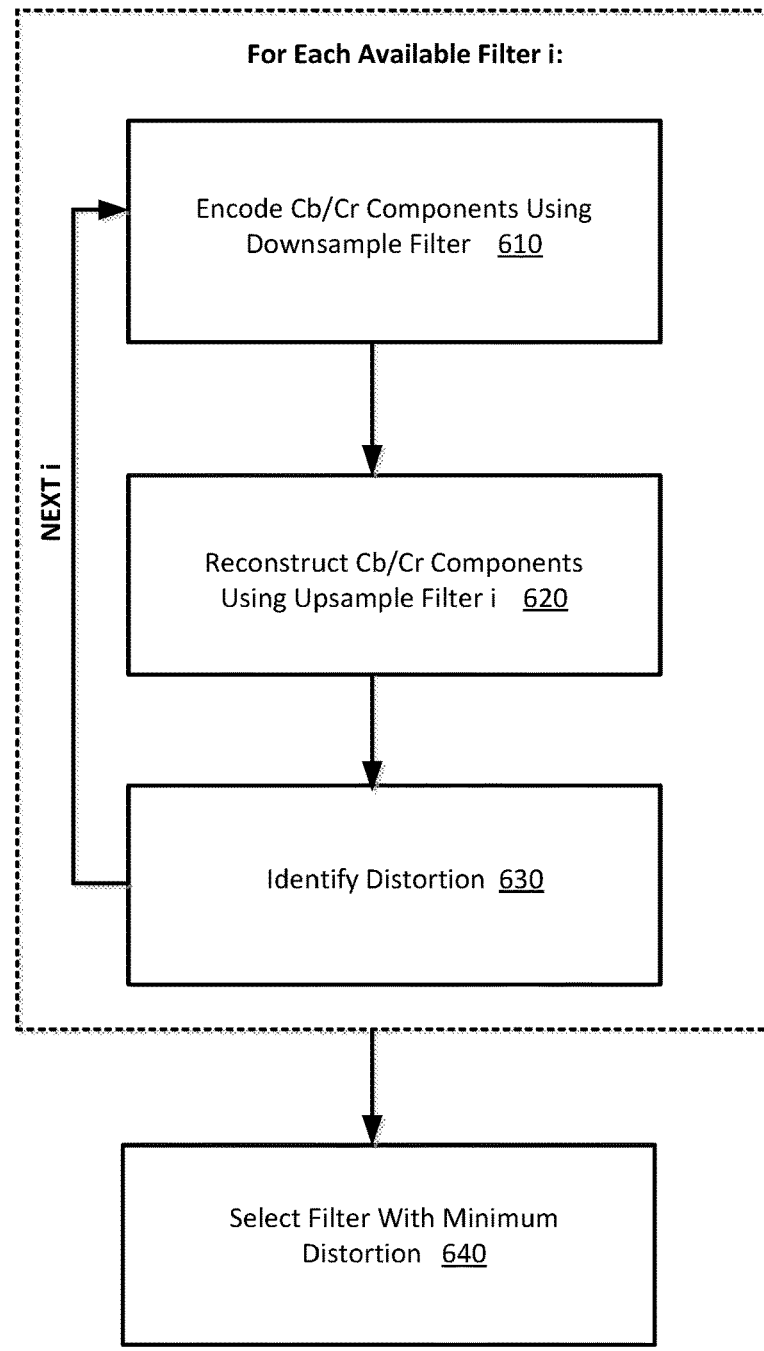
FIG. 6 is a flowchart for an example process for selecting a downsample filter.

Such optimization can be achieved by choosing an optimal filter based on the Cb/Cr component of the original source data, or some other color representation of the original source data (e.g. R, G, and B or X, Y, Z representations). FIG. 6 is a flowchart for an example process for selecting a downsample filter. In the example of FIG. 6, performing quantization and downsampling on the Cb/Cr component and then performing the inverse functions 620 to reconstruct the Cbr/Crr component using each different available filter, the original Cb/Cr may be compared to the reconstructed Cbr/Crr data to calculate the distortion added during the processing. The data can optionally be converted back to R, G, and B, or X, Y, Z, and the distortion be computed in those spaces instead. The filter that best minimizes distortion may then be selected for use in the encoding process.

As shown in FIG. 6, initially for a portion of the image data, the Cb and Cr components of the portion are encoded using one of the available upsampling filters (block 610). Then the reconstructed Crr and Cbr components of the portion are created using the corresponding downsampling filter (block 620). Then the distortion introduced in the encoding and reconstruction process may be calculated by comparing the original Cr/Cb components to the reconstructed Crr/Cbr components (block 630). Once all the available filters have been considered, the filter that results in the lowest distortion will be selected (block 640). The distortion metric used in the encoding decision process may be, for example, the mean or sum of absolute differences (MAD or SAD), the sum of absolute transformed differences (SATD), the mean or sum of square differences/errors (MSE or SSE), the peak signal to noise ratio (PSNR), the structural similarity index (SSIM), or other suitable operations.

Filter optimization may also occur end to end in different domains. For example, after Cbr and Crr are calculated, data in the RGB or XYZ color space may be calculated based on each of the original YCbCr and the reconstructed YrCbrCrr. Then the filter that minimizes distortion XYZ and XYZr may be calculated. This approach requires that we first make a preliminary decision for one color component, e.g. Cr, and using that decision try to optimize the other color component, i.e. Cb. After the optimization of this color component is completed we can go back to Cr and refine it further given the initial joint decision for Cb. This process may iterate multiple times. Iteration may repeat until no further change in performance is observed, or after N steps that may be determined by the user or application. The application, for example, may determine the number of steps adaptively, based, for example, on overall complexity budget involving the downsampling/upsampling process. The Y component would also need to be considered in this process, whereas characteristics and quantization on the Y component, as discussed in other sections of this application, may also be considered. Distortion in this extended color space could again be based on MAD, SAD, SATD, SSE, or PSNR. Distortion could be computed in the linear space or using an appropriately defined transfer function. Distortion from each color component in this extended space could be combined using an average or a weighted average, based on an importance of each color component, to generate a single distortion measurement. Weighting could also include content characteristics such as local and global brightness, whether the sample corresponds or is near an edge, texture, or a flat region among others.

Filters may be chosen based on comparisons of an original and a reconstructed sequence, scene, image, slice, block, pixel, or other portion of image data.

Similarly, with known filters, the color transform matrix (M) can be optimized in a similar manner as described above to minimize distortion.

With known upsampling and downsampling filters, and when a fixed bit-depth for quantization is used, the quantization parameters used in the quantization transform Q( ) may be optimized in a similar manner as described to minimize distortion. Such optimization may also take into consideration quantization boundaries and deadzones.

Information about the selected optimizations may be sent from the encoder to a receiver or decoder as part of encoding hints data transmitted with the encoded data. Encoding hints may be transmitted as side information and included in a bitstream such as H.264 as a Supplemental Enhancement Information (SEI) message. SEI messages may include a Post Filter Hint SEI message or a Chroma resampling filter hint SEI message. Such encoding hints data may include the transform matrix used in color transform, the parameters used in the quantization transform, and information about the filters used in the optimization process among others. A more complex process may also include aspects of the actual video encoding and decoding, i.e., through an initial coding pass using a codec such as H.264 or H.265. Such information could be fed back to the filter optimization stage to further refine the downsampling process. For example, if it is known that the encoding would be at a particular bitrate and chroma precision below a certain level will be lost due to quantization, that could be considered during the filtering process to either reduce complexity or improve quality. Noise characteristics of the signal, as well as the denoising impact of the filters and/or of the encoding process, may also be considered for the optimization and the filtering process.

It should be noted that all the operations above could be applied not only on non-constant luminance Y'CbCr data, but also constant luminance Y'CbCr data, or other color spaces such as Y'u'v' (CIE 1976), Y'u"v", the IPT color space, or other color spaces that may be appropriate for video encoding.

Chroma Re-sampling

Conventional color transform techniques use a non-linear transfer function (the transfer function or transfer domain). This is done in an effort to perform an initial basic compression of the signal to a fixed bit depth using some subjectively defined process (the transfer function). However, operations performed on color components in the transfer domain may result in a loss of precision but also errors, given the non-linearity of the transform function. These could be remedied by performing operations in the linear domain instead. The process may also be followed by additional color format conversion steps that aims at decorrelating color signals and isolating, commonly, intensity/brightness information from colour.

Figure 7:
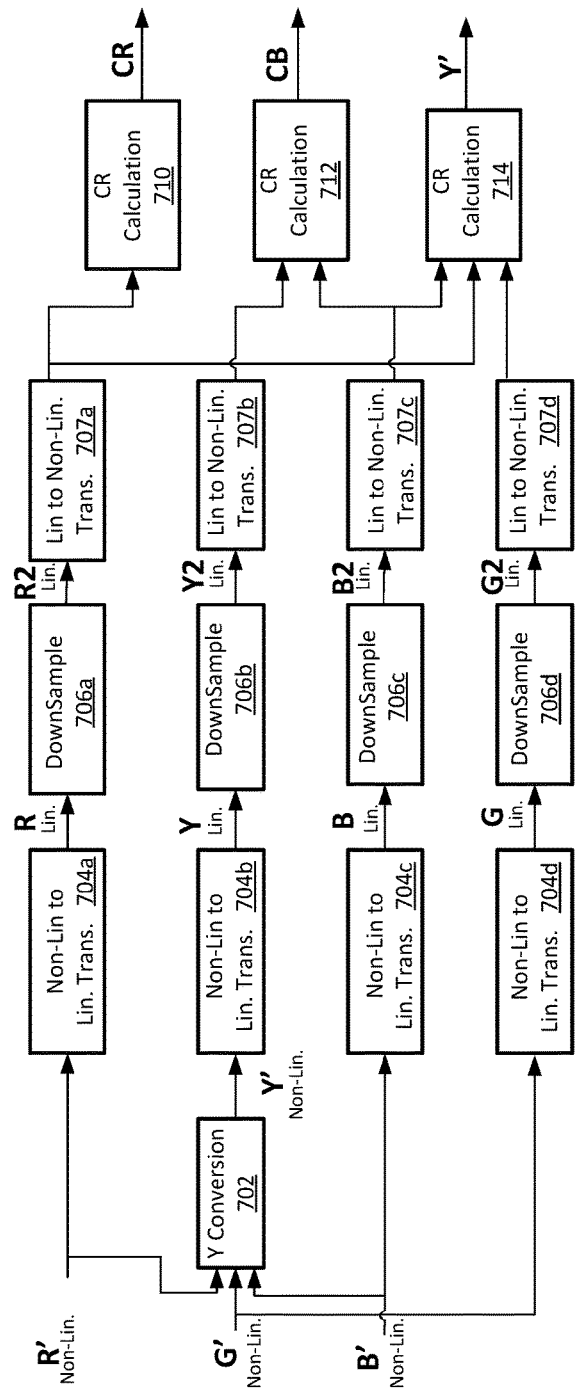
FIG. 7 is an example dataflow diagram for converting R'G'B' to Y'CrCb.

FIG. 7 is an example dataflow diagram for converting R'G'B' to Y'CrCb. To perform such operations, Y' in the non-constant luminance case may be calculated at block 702 as above, i.e., Y'=(M[1,1]*R'+M[1,2]*G'+M[1,3]*B'). Then the Y_ncl, B, R, and G components (in the linear domain) may be calculated in blocks 704a-704d using the inverse transform function represented as ITFO. For example, Y_ncl can be optionally computed as Y_ncl=ITF(Y'), and the other components could be computed as B=ITF(B'), R=ITF(R'), and G=ITF(G'). Then the downsampled version of each component may be calculated at blocks 706a-706d by applying a downsampling filter Down( ) to the linear components. Then the non-linear version of each downsampled component may be calculated using the transfer function TF( ) at blocks 707a-707d. Using the downsampled, non-linear version of the color components (B', R', and G'), the Y, Cb, and Cr components in the transfer domain may be calculated (as above) at blocks 710, 712, and 714, respectively. Alternatively, instead of the downsampled G' data we can use the downsampled Y_ncl data to generate the Cb and Cr components (as above). It should be noted that that derivation would not be the same as using the downsampled G' data, since the downsampled Y_ncl is derived directly from Y', which involves the non-linearities of the transfer function. In this scenario, an appropriate decoder that also considers the downsampled Y_ncl is necessary in deriving the final signals.

According to an embodiment, the calculation of the G component may not be necessary. The Y' value calculated initially at the Y conversion block from the R', G', and B' components may be output as the Y' component.

According to an embodiment, the Y' component after stage 704b may not be available. For example, Y2' may not be generated directly from the downsampled RGB values. Then Cr and Cb may be generated from R2, B2, and G2.

In an embodiment, we may determine that it is best to use a linear method for generating the downsampled version for one component, and a non-linear for the other. It is also possible to select that, for some instances, the non-linear method would be used for both, or a combination of the two could be considered. This decision could be made adaptively or based on some predefined conditions. For example, this can be determined by evaluating for both cases the distortion introduced in each scenario, as in the adaptive filtering process, compared to the original Cb and Cr components (without downsampling). An alternate color space could also be considered instead for this evaluation (e.g. RGB or XYZ), given an appropriate distortion measurement as discussed earlier. All possible or a subset of the combinations could be considered, e.g., consideration of non-linear downsampled Cb with linear downsampled Cr or/and vice versa, linear both, non-linear both, etc. The decision process could be done for an entire image, region of an image, or even a single sample. Additional combinations could be generated by averaging the samples together from each of the conversion processes. Averaging could be a simple average or weighted average based on some characteristics of the signal, or based on distortion performance.

The process of downsampling in the linear domain or the adaptive technique may be implemented in both the constant luminance and non-constant luminance domain, given the characteristics of each particular conversion, and may also be applied in alternative color spaces, such as Y'u'v', Y'u"v", IPT or others. In those cases, for example, conversion to an intermediate color space other than RGB may be required. In particular, conversion to XYZ or other color spaces such as LMS, e.g., for the IPT case, may first be required. Then downsampling is performed in those spaces to generate the downsampled versions, and the appropriate downsampled signals that correspond to the color components are derived from these images.

Closed Loop Conversions

Conventionally, each color component of image data is quantized and converted independently of each other. For example, the Y', Cb, and Cr components, in the constant luminance or non-constant luminance domain, may be calculated and then each will be quantized by applying a quantizing function Q( ). However, once the Yq component is calculated, this value may be used to generate the Cb/Cr components. The same consideration could be made for other color spaces where there might be a dependency between the color components.

Figure 8:
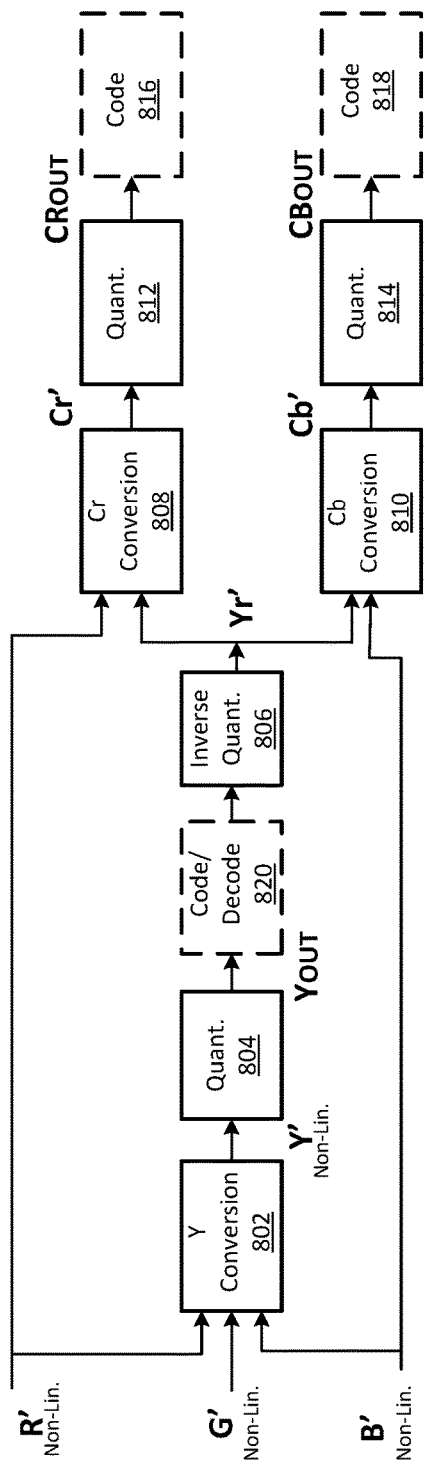
FIG. 8 is an example dataflow diagram for converting R'G'B' to YCrCb.

FIG. 8 is an example dataflow diagram for converting R'G'B' to YCbCr. In this example, in the non-constant luminance domain, upon receiving the RGB input, Y' may be calculated (in the transfer domain) at block 802 as above (Y'=M[1,1]*R'+M[1,2]*G'+M[1,3]*B'). Then the quantized value of Y' may be calculated at block 804 and, using the quantized value, Yr' may be reconstructed by inverse quantization at block 806. Then, using the reconstructed value of Yr', Cb' and Cr' may be calculated as described above (Cb'=(B'−Yr')*Sb at block 810 and Cr'=(R'−Yr')*Sr at block 808). The quantized values of Cr and Cb may then be calculated using a quantization function at blocks 812 and 814, respectively. The downsampling process, such as in the case of converting the data to 4:2:2 or 4:2:0 (not depicted in FIG. 8), and the distortion this introduces, may also be considered in this step, as discussed in previous sections.

Similarly, in the constant luminance domain, Y in the linear domain is first calculated as Y=M[1,1]*R+M[1,2]*G+M[1,3]*B and then Y' in the transfer domain is calculated as Y'=TF(Y). Then the quantized value of Y', Cr', and Cb' may be calculated as described above for the non-constant luminance case.

The decoder or receiver may inverse these processes as necessary to generate recovered color components.

As shown in FIG. 8, the Y component may additionally be encoded and decoded at block 820 to account for compression loss due to a lossy compressor, such as coding engine 108 of FIG. 1, when calculating the Cb/Cr components.

According to an embodiment, any error introduced in previously quantized and processed color components can be fed into later quantized and processed color components. By changing the order of the component calculation to compute different components first, and then use that information to calculate the other components: the 1) quantization error 2) compression error and/or 3) chroma subsampling error of any one component may be considered in the creation of the remaining components.

For example, Cb may be calculated as Sb*M[1,1]*R−Sb*M[1,2]*G+(Sb−Sb*M[1,3])*B. Then Y is calculated as Y=B−Cb/Sb and Cr is calculated as Cr=(Sr−Sr*M[1,1])*R−Sr*M[1,2]*G−Sr*M[1,3]*B. Similarly, Cr may be calculated first, then Y and then Cb or Cr may be calculated next, then Cb and then Y, etc.

The above steps could be applied on other color spaces and not only Y'CbCr data. Other spaces may include, for example, the Y'u'v', Y'u"v", and IPT color spaces among others. Intermediate conversion to other color spaces, such as XYZ or LMS may be required for this conversion. These steps could be combined with all other methods discussed in all other sections of this disclosure.

General Considerations

Each of the processes described above may be applied in alternative color spaces including YUV, Y'u'v', XYZ, Y'dzdx, Y'u"v", IPT, LAB, etc.

According to an embodiment, the encoder may transmit information with the coded video data in logical channels established by the governing protocol for out-of-band (side-information or side-info) data. Such information may include filter selection, quantization parameters, and other hint information. As one example, used by the H.264 protocol, the encoder 200 may transmit accumulated statistics in a supplemental enhancement information (SEI) channel specified by H.264. In such an embodiment, processes introduce the information in a logical channel corresponding to the SEI channel. When the present invention is to be used with protocols that do not specify such out-of-band channels, a separate logical channel for the noise parameters may be established within the output channel.

Although the foregoing description includes several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims. For example, embodiments of the present invention may provide a method of coding; a non-transitory computer readable medium storing program instructions that, when executed by a processing device, causes the device to perform one or more of the methods described herein; a video coder, etc.

As used herein, the term "computer-readable medium" may include a single medium or multiple media, such as a centralized or distributed database, and/or associated caches and servers that store one or more sets of instructions. The term shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The present specification describes components and functions that may be implemented in particular embodiments which may operate in accordance with one or more particular standards and protocols. However, the disclosure is not limited to such standards and protocols. Such standards periodically may be superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and terminals that implement encoding optimization in video coding applications. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system, and executed. And, of course, these components may be provided as hybrid systems that distribute functionality across dedicated hardware components and programmed general-purpose processors, as desired.

In addition, in the foregoing description, various features may be grouped or described together for the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the description, with each claim standing on its own as defining separately claimed subject matter.

Also, where certain claims recite methods, sequence of recitation of a particular method in a claim does not require that that sequence is essential to an operable claim. Rather, particular method elements or steps could be executed in different orders without departing from the scope or spirit of the invention.

We claim:

1. A method for converting digital images, comprising:
    converting image content having a source color space and a first format to a second color space;
    for each of a plurality of candidate downsample filters:
        downsample filtering the image content in the second color space and the first format with a respective downsample filter, the downsample filtering generating image data in the second color space and a second format;
        upsample filtering the downsample-filtered content obtained from the respective downsample filter with an upsample filter that is fixed for all candidate downsample filters of the plurality; and
        estimating a distortion of the respective downsample filter from a comparison of the converted image content input to the respective downsample filter and the upsample-filtered data obtained therefrom; and
    generating output image content in the second color space and the second format according to a downsample filter selected according to the estimated distortions.

2. The method of claim 1, further comprising:
for each of the plurality of candidate downsample filters:
upsample filtering the downsample-filtered content obtained from the respective downsample filtering according to an alternate upsample filter parameters; and
estimating a distortion of the respective downsample filter from a comparison of the converted image content input to the respective downsample filter and the upsample-filtered data obtained from the alternate upsample filter parameters.

3. The method of claim 1, further comprising outputting an indicator of the selected downsample filter.

4. The method of claim 1, further comprising compressing the output image content.

5. The method of claim 1, further comprising selecting a downsample filter for each pixel of output image content by repeating the method on a pixel-by-pixel basis.

6. The method of claim 1, wherein the source format is an RGB format, the second format is a luma-chroma color format, the candidate downsample filters are selected for a chroma component of the converted image.

7. The method of claim 6, wherein the operation for converting from the source format to the second format includes:
converting the image content from R, G, and B component signals of the RGB format to a first component signal of the second format;
quantizing the first component signal;
reconstructing the first component signal by inverse quantization of the quantized first component signal;
generating a second component signal of the second format from at least the reconstructed first component signal and an RGB component signal.

8. The method of claim 1, further comprising quantizing image data after converting the format and before applying the upsample filter.

9. The method of claim 8, wherein the converted image content is quantized prior to filtering according to the respective downsample filter.

10. The method of claim 8, wherein the downsample-filtered content is quantized prior to filtering according to the upsample filter.

11. A non-transitory computer readable medium comprising instructions for converting digital images, the medium comprising instructions that, when executed on a computer, cause the computer to:
convert image content having a source color space and a first format to a second color space;
for a plurality of candidate downsample filters:
filter the image content in the second color space and first format according to a respective downsample filter, the downsample filtering generating image data in the second color space and a second format;
filter the downsample-filtered content according to an upsample filter that is fixed for all candidate downsample filters of the plurality; and
estimate a distortion corresponding to the respective downsample filter from the upsample-filtered content; and
generate output image content in the second color space and the second format according to a downsample filter selected according to the estimated distortions.

12. The non-transitory computer readable medium of claim 11, further comprising instruction that cause the computer to:
for the plurality of candidate downsample filters:
filter the downsample-filtered content obtained from the respective downsample filter according to a plurality of alternate upsample filters; and
estimate distortions corresponding to the combination of the respective downsample filter and each of the plurality of upsample filters from the upsample-filtered content.

13. The non-transitory computer readable medium of claim 11, wherein the instructions further cause the computer to output an indicator of the selected downsample filter.

14. The non-transitory computer readable medium of claim 11, wherein the instructions further cause the computer to compress the output image content.

15. The non-transitory computer readable medium of claim 11, wherein the instructions further cause the computer to select a downsample filter for each pixel of an input image by repeating the instructions of claim 11 on a pixel-by-pixel basis.

16. The non-transitory computer readable medium of claim 11, wherein the source color format is RGB, the second color format is a luma-chroma color format, the candidate downsample filters are selected for a chroma component of the converted image.

17. The non-transitory computer readable medium of claim 11, wherein the instructions to convert from the source color format to the second color format cause the computer to:
convert the image content from R, G, and B component signals of an RGB format to a first component signal of the second format;
quantize the first component signal;
reconstruct the first component signal by inverse quantization of the quantized first component signal;
generate a second component signal of the second format from at least the reconstructed first component signal and an RGB component signal.

18. The non-transitory computer readable medium of claim 11, wherein the instructions further cause the computer to quantize image data after converting the color format and before applying the upsample filter.

19. A system for converting digital images, comprising:
a converter for converting image content having a source color space and a first format to a second color space;
an estimator wherein the estimator repeats, for a plurality of candidate downsample filters:
filtering converted image content in the second color space and the first format according to a respective downsample filter the downsample filtering generating image data in the second color space and a second format,
filtering the downsample-filtered content according to an upsample filter that is fixed for all candidate downsample filters of the plurality, and
estimating a distortion corresponding to the respective downsample filter from the upsample-filtered content; and
an output for generating output image content in the second color space and the second format according to a downsample filter selected according to the estimated distortions.

20. The system of claim 19, wherein the estimator further repeats, for the plurality of candidate downsample filters, filtering the downsample-filtered content according to a plurality of alternate upsample filters.

21. The system of claim 19, wherein the output image content includes an indicator of the selected downsample filter.

22. The system of claim 19, further comprising a compressor for compressing the output image content.

23. The system of claim 19, wherein the downsample filter is selected for each pixel of an input image by repeating the method on a pixel-by-pixel basis.

24. The system of claim 19, wherein the source color format is RGB, the second color format is a luma-chroma color format, the candidate downsample filters are selected for a chroma component of the converted image.

25. The system of claim 19, wherein the converter includes:
   converting the image content from R, G, and B component signals of the RGB format to a first component signal of the second format;
   quantizing the first component signal;
   reconstructing the first component signal by inverse quantization of the quantized first component signal;
   generating a second component signal of the second format from at least the reconstructed first component signal and an RGB component signal.

26. The system of claim 19, further comprising a quantizer for quantizing image data in the second color format.

27. An image receiver, comprising:
   a decoder for decoding a compressed image, wherein the compressed image includes side information relating to a filter selection; and
   a format converter for converting the decoded image, including a color format converter and a plurality of upsampling filters, and wherein the side information is used at least in part to determine which of the plurality of upsampling filters are used to upsample a chroma channel of the decoded image.

28. The image receiver of claim 27, wherein the color format converter converts a luma-chroma color format into an RGB color format.

29. The method of claim 1, where the downsample filtering converted image content includes filtering converted luma image content.

30. The method of claim 1, where the downsample filtering converted image content includes filtering converted chroma image content.

* * * * *